(12) United States Patent
Fukada

(10) Patent No.: US 7,272,535 B2
(45) Date of Patent: Sep. 18, 2007

(54) FAILURE HISTORY MANAGEMENT APPARATUS

(75) Inventor: Akio Fukada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/377,646

(22) Filed: Mar. 17, 2006

(65) Prior Publication Data

US 2006/0271339 A1 Nov. 30, 2006

(30) Foreign Application Priority Data

Mar. 18, 2005 (JP) ............................. 2005-078835

(51) Int. Cl.
*G06F 11/30* (2006.01)
*G21C 17/00* (2006.01)

(52) U.S. Cl. ..................................................... 702/185
(58) Field of Classification Search ................ 702/180, 702/185, 187
See application file for complete search history.

(56) References Cited

U.S. PATENT DOCUMENTS 6,963,277 B2 * 11/2005 Imasaki et al. .......... 340/539.1
2001/0027350 A1 * 10/2001 Koga et al. .................... 700/95

FOREIGN PATENT DOCUMENTS

JP 2000-259455 * 9/2000
JP 2003-308363 A 10/2003

OTHER PUBLICATIONS

English translation of Nobuko (JP 2003-308363), Oct. 2003.*

* cited by examiner

*Primary Examiner*—Michael Nghiem
(74) *Attorney, Agent, or Firm*—Foley & Lardner LLP

(57) ABSTRACT

A failure history management system includes a radio identification tag that is placed on a device and stores device-identifying-information that identifies the device, a management computer for managing failure history data of the device, and a terminal unit configured to identify the device from the device-identifying information stored in the radio identification tag, to read failure history data of the device from the management computer, and to provide failure history data of the device to the management computer.

3 Claims, 10 Drawing Sheets

FIG. 8

PART NUMBER

KSNR

DISPLAY REQUEST

FIG. 9

DEVICE

| CUSTOMER | OUTLINE OF FAILURE HISTORY INFORMATION |
|---|---|
| A COMPANY | AUG. 2, 2005 AT 8 A.M. |
| B COMPANY | JUN. 30, 2005 AT 6 P.M. |
| ⁓ | ⁓ |
| N COMPANY | SEP. 30, 2005 AT 3 P.M. |

FIG. 12

| CUSTOMER | SITE | EVENT DATE | EVENT CONTENTS | PARTICULARS | NOTE |
|---|---|---|---|---|---|
| B COMPANY | X | 19990101 | SHIPMENT | | |
| | | 19990705 | FAILURE | F01 | |
| | | 20000301 | FAILURE | F02 | |
| | | 20000305 | MAINTENANCE | EXCHANGE | |
| | | 20000401 | FAILURE | A01 | |

FIG. 13

| CUSTOMER | SITE | EVENT DATE | EVENT CONTENTS | PARTICULARS | NOTE |
|---|---|---|---|---|---|
| A COMPANY | Q | 20000101 | SHIPMENT | | |
| | | 20000801 | FAILURE | K02 | |
| | | 20008205 | MAINTENANCE | EXCHANGE | |
| | R | 20010302 | SHIPMENT | | |
| | | 20010501 | FAILURE | F01 | |
| | | 20010523 | MAINTENANCE | EXCHANGE | |
| | | 20010701 | FAILURE | B01 | |

FAILURE HISTORY MANAGEMENT APPARATUS

CROSS-REFERENCE TO RELATED APPLICATIONS

This application is based upon and claims the benefit of priority from the prior Japanese Patent Application No. 2005-78835 filed on Mar. 18, 2005, the entire contents of which are incorporated herein by reference.

FIELD OF THE INVENTION

This invention relates to a failure history management system which can manage the failure history of a device such as electrical or mechanical equipment.

BACKGROUND OF THE INVENTION

Generally, in a plant, various equipment are arranged including electric equipment and monitor control equipment. In devices including such equipment, many require long-term stable operation. It is thus useful to prevent operational stoppages caused by failure of the equipment.

To prevent such stoppages due to equipment failure, it is possible to record a failure history of a device, and preventive maintenance can be performed as necessary based on the tendency of a failure to occur.

As a product and related information management method, Japanese Patent Disclosure (kokai) No. 2003-308363 discloses a method in which a guarantee on a product or data relating to the product, such as management information of a recycle cost, can be easily read.

Namely, a product includes a memory unit for readably storing data relating to the product. The data relating to the product includes product name and/or the manufacture's serial number, and the term of guarantee on the product corresponding to the product name and/or the manufacture's serial number.

In the related information managing method, the information relating to the product is managed by means of a computer, an identifier for identifying each of the products is readably stored in a memory unit in the product, the identifier is read, and information relating to the corresponding product is searched with this identifier as a search key and displayed.

In Japanese Patent Disclosure (kokai) No. 2003-308363, an identifier for identifying each of the products is readably stored in a memory unit of the product, the identifier is read, and information relating to the corresponding product is searched with this identifier as a search key and displayed.

Therefore, in Japanese Patent Disclosure (kokai) No. 2003-308363, failure history data of the shipped product is not managed.

Particularly, in a large-scale plant, intricately and highly developed devices are arranged. It would be useful for an equipment manager to manage failure history data of these devices, perform preventive maintenance as necessary based on a tendency of failures to occur, and prevent the stoppage of the equipment due to the failure ahead of time.

SUMMARY OF THE INVENTION

According to one aspect of the invention, a failure history management system includes a radio identification tag that is placed on a device and stores device-identifying-information that identifies the device, a management computer for managing failure history data of the device, and a terminal unit configured to identify the device from the device-identifying information stored in the radio identification tag, to read failure history data of the device from the management computer, and to provide failure history data of the device to the management computer.

Other and further advantages of this invention will become apparent upon an understanding of the illustrative embodiments to be described herein or will be indicated in the appended claims while various advantages not referred to herein will be appeared to one skilled in the art upon employment of the invention in practice.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIGS. 8 to 10 show display screens of a display operating device;

FIG. 12 is a diagram showing failure history information of a system which is displayed on the display operating device of the failure history management system according to an embodiment of the invention; and FIG. 13 is a diagram showing failure history information of the system, which is displayed on the display operating device of the failure history management system according to an embodiment of the invention.

DETAILED DESCRIPTION OF THE INVENTION

Embodiments of a failure history management system according to the invention will be described with reference to drawings.

Figure 1:
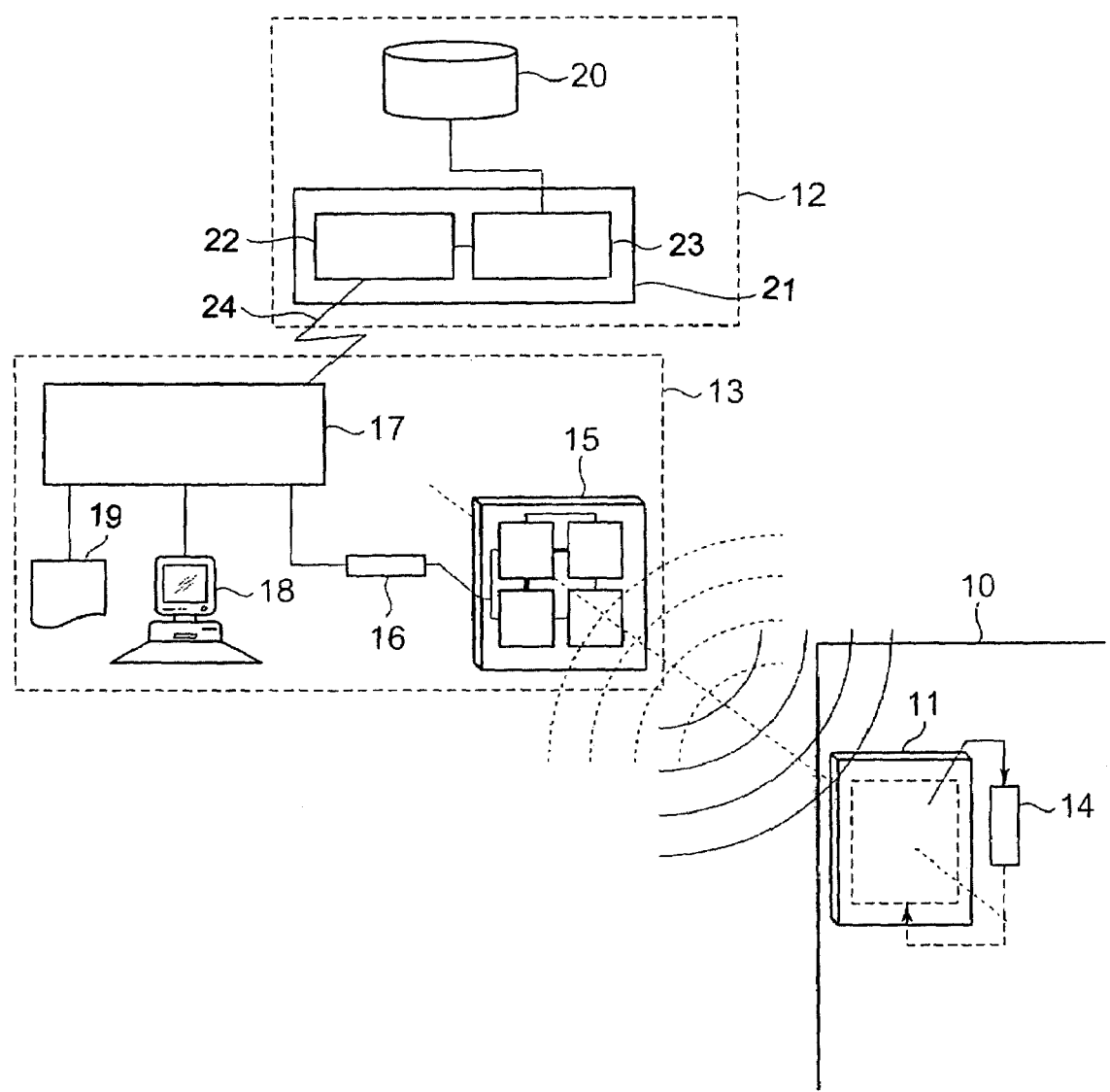
FIG. 1 is a block diagram of a failure history management system according to embodiments of the invention.

Embodiments in accordance with the present invention will be explained below. FIG. 1 is a block diagram of a failure history management system according to embodiments of the invention.

The failure history management system includes a radio identification tag (radio frequency identification tag) (hereinafter referred to as a RFID) 11 that is placed on a device 10, comprising one or more pieces of equipment, and has a radio communication function based on technology of Radio Frequency Identification, a management computer 12 for managing failure history data of the device 10, and a terminal unit 13 that sends or receives data to the RFID 11 and the management computer 12.

The RFID 11 may be placed inside of the device 10 as long as a radio signal can pass through the device 10.

The RFID 11 can be a non-rewritable type or a rewritable type. In the non-rewritable type RFID, device-identifying-information for identifying the device is recorded in a memory part included in the RFID.

In the rewritable type RFID, in addition to the device-identifying-information for identifying the device constituting the equipment, failure history data of the device that is newly added is recorded in a memory part included in the RFID.

The device-identifying-information includes data by which the device can be specified, such as a part number and a manufacturer's serial number for the device 10.

The failure history data also includes installation environment information that affects the device, such as a failure occurrence date of the device, cause of failure, customer's name, plant, site name, temperature, and humidity.

The device-identifying-information stored in the RFID 11 is read out from the memory part, modulated by a modulator 14, and transmitted to a reader/writer 15 of the terminal device 13.

The signal received by the reader/writer 15 is modulated by a modulator 16 and outputted to a terminal main part 17. The reader/writer 15 includes a radio communication function part and a memory part for storing transmission and reception data (not shown).

A display operating device 18 and a printer 19 are connected to the terminal main part 17.

The management computer 12 includes a failure history database memory 20 that stores failure history data and a main part 21.

The main part 21 of the management computer 12 includes a communication part 22 and an operation part 23.

The management computer 12 and the terminal device 13 perform data transmission and reception between them through a communication line (network) 24.

Namely, the terminal device 13 identifies the device 10 from the device-identifying-information stored in the RFID 11 located on the device 10, and reads out the failure history data of the device 10 from the failure history database memory 20 of the management computer 12, or inputs additionally the failure history data of the device 10 to the failure history database memory 20.

Thus, the failure history data of the device 10 is stored in the management computer 12, and subsequent failures can be forecasted on the basis of the tendency of the failure occurrence of the device 10, which makes it possible to define operational risks of the equipment (a failure forecast, a forecast of the remaining life, and a forecast of an exchange time for the device 10).

By defining the operation risks of the equipment, a method (RBM/Risk Based Maintenance) in which the occurrence of failure is prevented prior to failure by preventive maintenance at an optimum cost can be effectively adopted.

Figure 2:
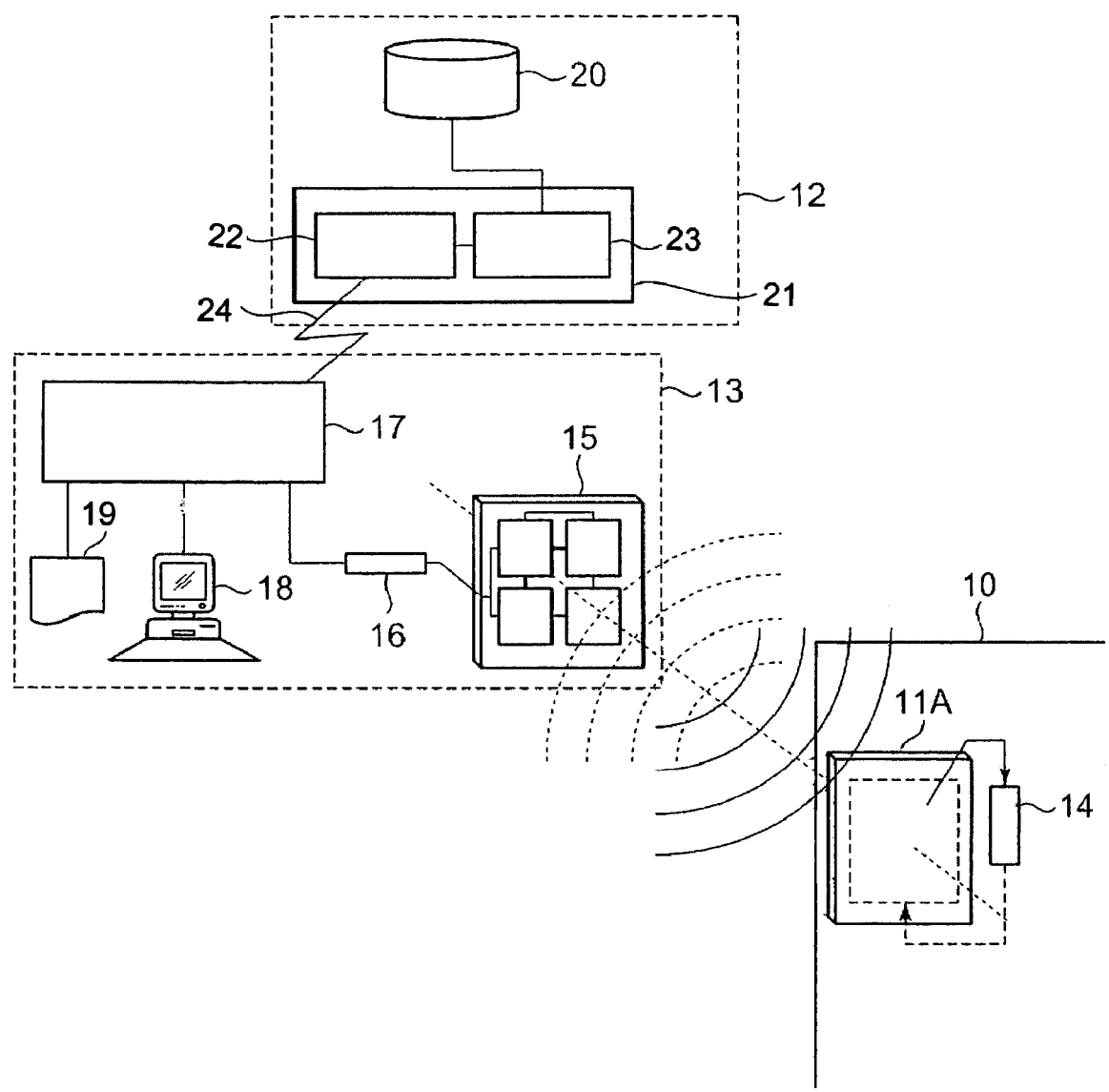
FIG. 2 is a block diagram of a failure history management system according to an embodiment of the invention using a non-rewritable type of RFID (Radio Frequency Identification)

FIG. 2 is a block diagram of a failure history management system according to an embodiment in accordance with the invention using a non-rewritable type of RFID 11A is adopted.

Figure 3:
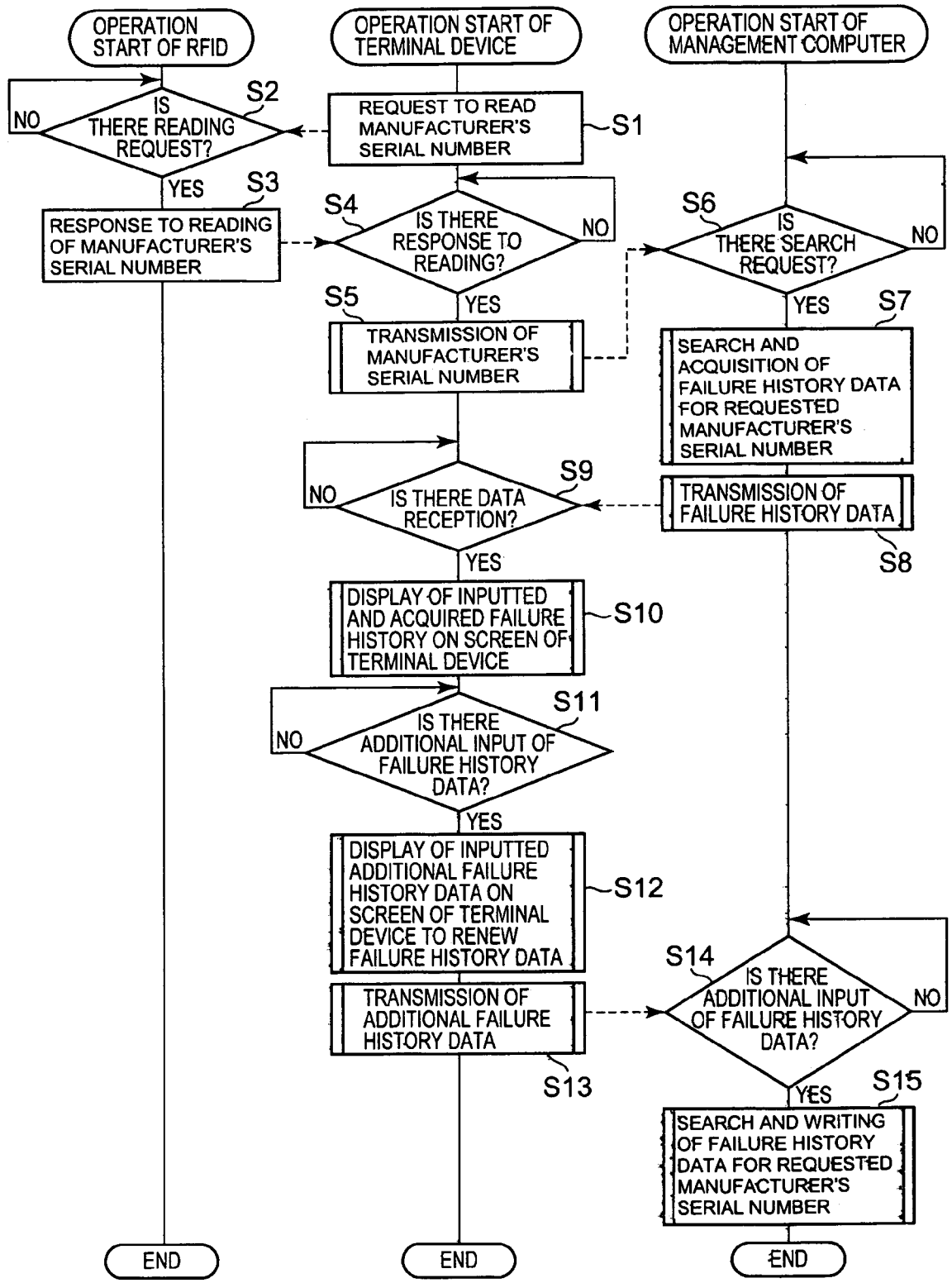
FIG. 3 is a diagram for explaining the operation of the failure history management system according to the embodiment of the invention using the non-rewritable type of RFID.

FIG. 3 is a diagram for explaining the operation of the failure history management system when failure history data (result of failure analysis) is added.

If a non-rewritable type of RFID 11A is used, a result of failure analysis (date and time of failure, contents of failure, or the like) that has been newly input through the display operating device 18 by an operator is input as additional failure history data by the display operating device 18 of the terminal device 13.

The inputted failure history data is stored as the failure history data of the device 10 in the failure history database memory 20 of the management computer 12.

In FIG. 2, the reader/writer 15 of the terminal device 13 is held to the RFID 11A of the device 10 that is a target of the failure history management.

The terminal main part 17 outputs to the reader/writer 15 a request to read the manufacture's serial number of the device 10 that is the target of the failure history management (S1).

The RFID 11A judges whether there is a reading-out request from the reader/writer 15 of the terminal device 13 (S2).

If the RFID 11A judges in step S2 that there is a reading-out request, the RFID 11A reads out the manufacturer's serial number of the device 10 that is the target of the failure history management from the memory included in the RFID 11A, and transmits the serial number to the reader/writer 15 of the terminal device 13 in response to the request (S3).

The terminal main part 17 of the terminal device 13 judges whether the RFID 11A makes a response to the request to read out the manufacturer's serial number (S4).

When the RFID 11A makes the response to the reading-out request in step S4, the terminal main part 17 transmits the received manufacturer's serial number to the management computer 12 (S5).

In the management computer 12, the operation part 23 judges whether the manufacturer's serial number of the device 10 has been received from the terminal device 13 (whether there is search request of failure history data of the device 10) (S6).

In the step S6, in case that the operation part 23 judges that there is the search request of failure history data, the operation part 23 searches and acquires the failure history data of the device 10 corresponding to the manufacturer's serial number from the failure history database memory 20 (S7).

The management computer 12 transmits the failure history data of the device 10 acquired by the operation part 23 through the communication part 22 and the network 24 to the terminal device 13 (S8).

The terminal device 13 judges whether there is reception of the failure history data from the management computer 12 (S9). When the failure history data has been received, the terminal device 13 displays the failure history data of the device 10 on the display operating device 18 (S10). The terminal device 13 also judges whether new failure history data relating to the device 10 is additionally input from the display operating device 18 by the operator (S11).

In the step S11, if it is judged that there is additional input of failure history data, the terminal device 13 displays the added failure history data on the display operating device 18 to renew the failure history data (S12), and transmits the added failure history data to the management computer 12 (S13).

The operation part 23 of the management computer 12 judges whether the added failure history data has been received through the communication part 22 (S14).

In the step S14, if it is judged that the added failure history data has been received, the operation part 23 searches, from the failure history database memory 20, the failure history data of the device 10 that has received the search request of the failure history data, and the operation part 23 writes the added failure history data as the failure history data of the device 10 in the failure history database memory 20 to renew the failure history data (S15).

Thus, when the non-rewritable type RFID is used, if the result of failure analysis is input as added failure history data, the added failure history data is input from the terminal device 13 to the management computer 12 and stored in the failure history database memory 20.

Figure 4:
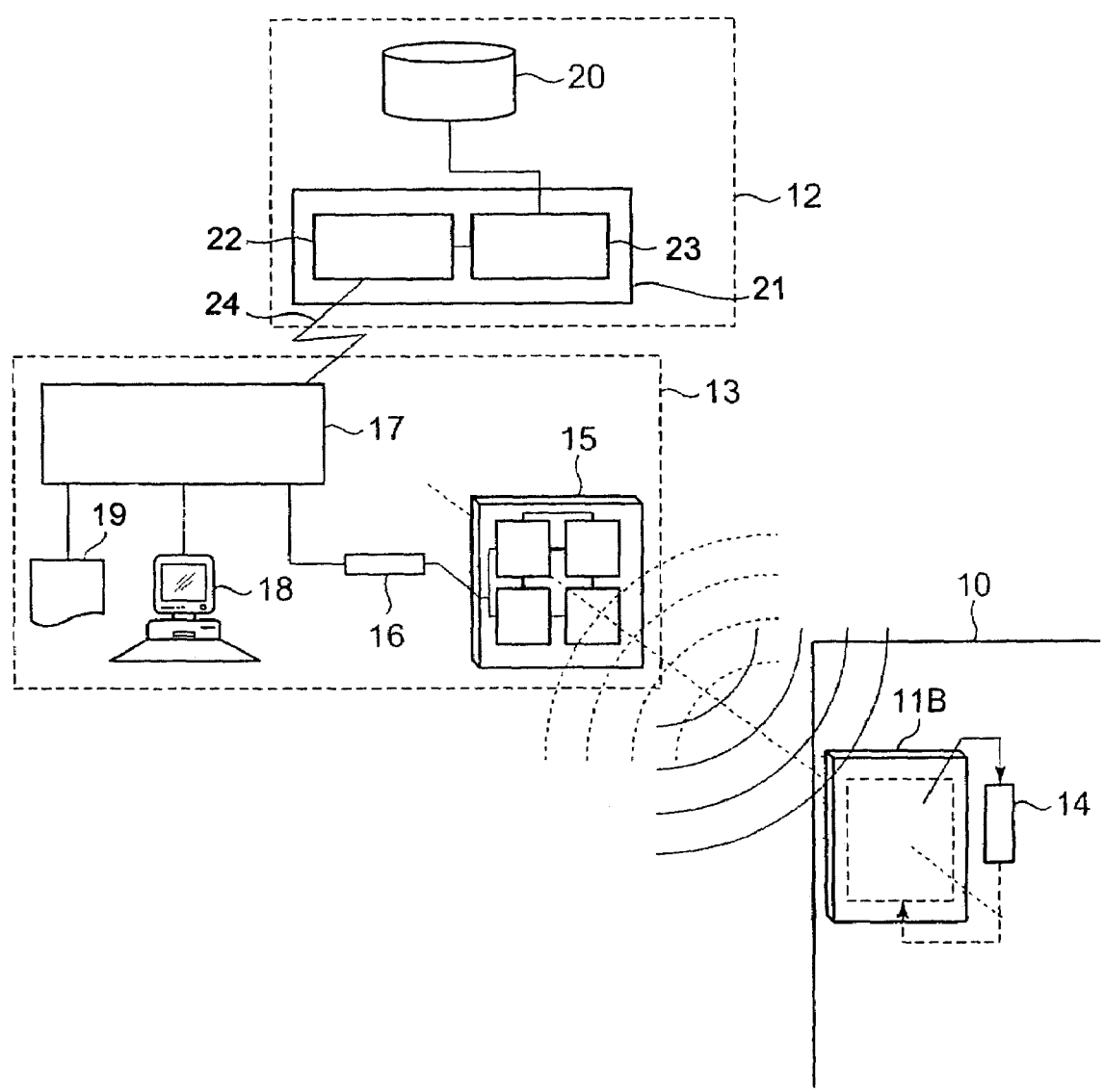
FIG. 4 is a block diagram of a failure history management system according to an embodiment of the invention using a rewritable type of RFID.

FIG. 4 is a block diagram of a failure history management system according to an embodiment in accordance with the invention using a rewritable type of RFID 11B.

Figure 5:
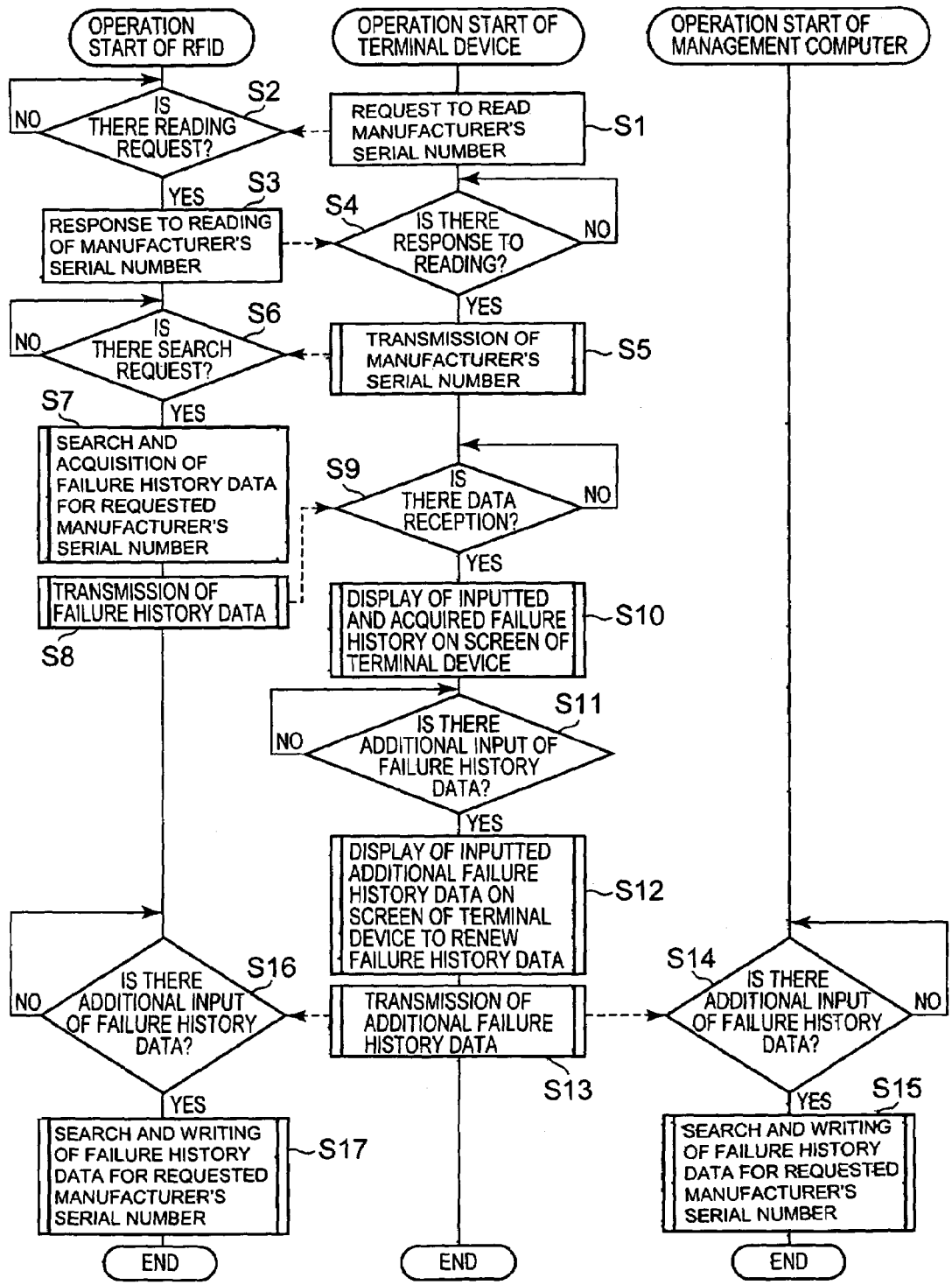
FIG. 5 is a diagram for explaining the operation of the failure history management system according to the embodiment of the invention using the rewritable type of RFID.

FIG. 5 is a diagram for explaining the operation of the failure history management system when failure history data (result of failure analysis) is added.

If the rewritable type of RFID 11B is used, a result of failure analysis (added failure analysis data) that has been newly input by an operator is input through an input part (not shown) by the display operating device 18 of the terminal device 13.

The inputted failure analysis result is transmitted from the terminal display device 18 through the network 24 to the management computer 12.

The communication part 22 receives the failure analysis result through the network 24, and stores it in the failure history database memory 20 as failure history data of the device 10.

Similarly, the newly inputted failure analysis result is transmitted and outputted from the reader/writer 15 of the terminal device 13 to the RFID 11B.

In the RFID 11B, after the failure analysis result (added failure analysis data) has been received, it has been additionally written as data of the device 10 into the memory included in the RFID 11B.

The flow of operation will be described with reference to FIG. 4.

In FIG. 4, the reader/writer 15 of the terminal device 13 is held to the RFID 11B of the device 10, and the terminal main part 17 outputs to the reader/writer 15 a request to read the manufacturer's serial number of the device 10 (S1).

The RFID 11B judges whether there is a reading-out request from the reader/writer 15 of the terminal device 13 (S2).

If the RFID 11B judges in the step S2 that there is a reading-out request, the RFID 11B reads out the manufacturer's serial number of the device 10, and transmits the manufacturer's serial number to the reader/writer 15 of the terminal device 13 in response to the request (S3).

The terminal main part 17 judges whether the RFID 11B makes a response to the reading request of the manufacture's serial number (S4).

When there is a response to the reading request from the RFID 11B in step S4, the terminal device 13 transmits the received manufacturer's serial number to the RFID 11B (S5).

The RFID 11B judges whether there is the reception of the manufacturer's serial number of the device 10 from the terminal device 13 (whether there is search request of failure history data of the device 10) (S6).

If there is a search request of failure history data, the RFID 11B searches and acquires the failure history data of the device 10 corresponding to the manufacturer's serial number from the memory part included in the RFID 11B (S7).

The failure history data acquired in the step S7 is transmitted from the RFID 11B to the terminal device 13 (S8).

The terminal device 13 judges whether there is reception of the failure history data from the RFID 11B (S9). When terminal device 13 judges that there is reception of the failure history data, the terminal device 13 displays the failure history data of the device 10 on the display operating device 18 of the terminal device 13 (S10). The terminal device 13 also judges whether there is additional input of failure history data from the display operating device 18 by the operator (S11).

If it is judged that there is additional input of failure history data, the terminal device 13 displays the added failure history data on the display operating device 18 to renew the failure history data (S12), and the added failure history data is transmitted to the RFID 11B and the management computer 12 (S13).

The management computer 12 judges whether the added failure history data has been received (S15).

If it is judged that the added failure history data has been received by the operation part 23, the operation part 23 searches, from the failure history database memory 20, the failure history data of the device 10 that has received the search request of the failure history data, and the operation part 23 writes the added failure history data in the failure history database memory 20 to renew the failure history data (S115).

Similarly, the RFID 11B also judges whether the added failure history data of the device 10 has been received (S16).

When the RFID 11B judges that the added failure history data of the device 10 has been received, the RFID 11B searches the failure history data of the device 10 that has received the search request of the failure history data from the memory part included in the RFID 11B, and the RFID 11B writes the added failure history data in the memory to renew the failure history data (S17).

Thus, the data stored in the RFID 11B can be used for reference of the past failure history data.

If the failure history data is newly added, it is stored in both the RFID 11B and the failure history database memory part 20 of the management computer 12.

If the rewritable type RFID 11B is used, the failure occurrence history information is also stored in the RFID 11B. Therefore, without connection to the management computer 12, the failure history data of the device itself can be determined. It is also possible to permit the operator to select the reference to the failure history data from either the RFID 11B or the management computer 12.

Next, the operation of the failure history management system will be described below with reference made to both the past failure history of the fault device and a failure tendency of the device.

Figure 6:
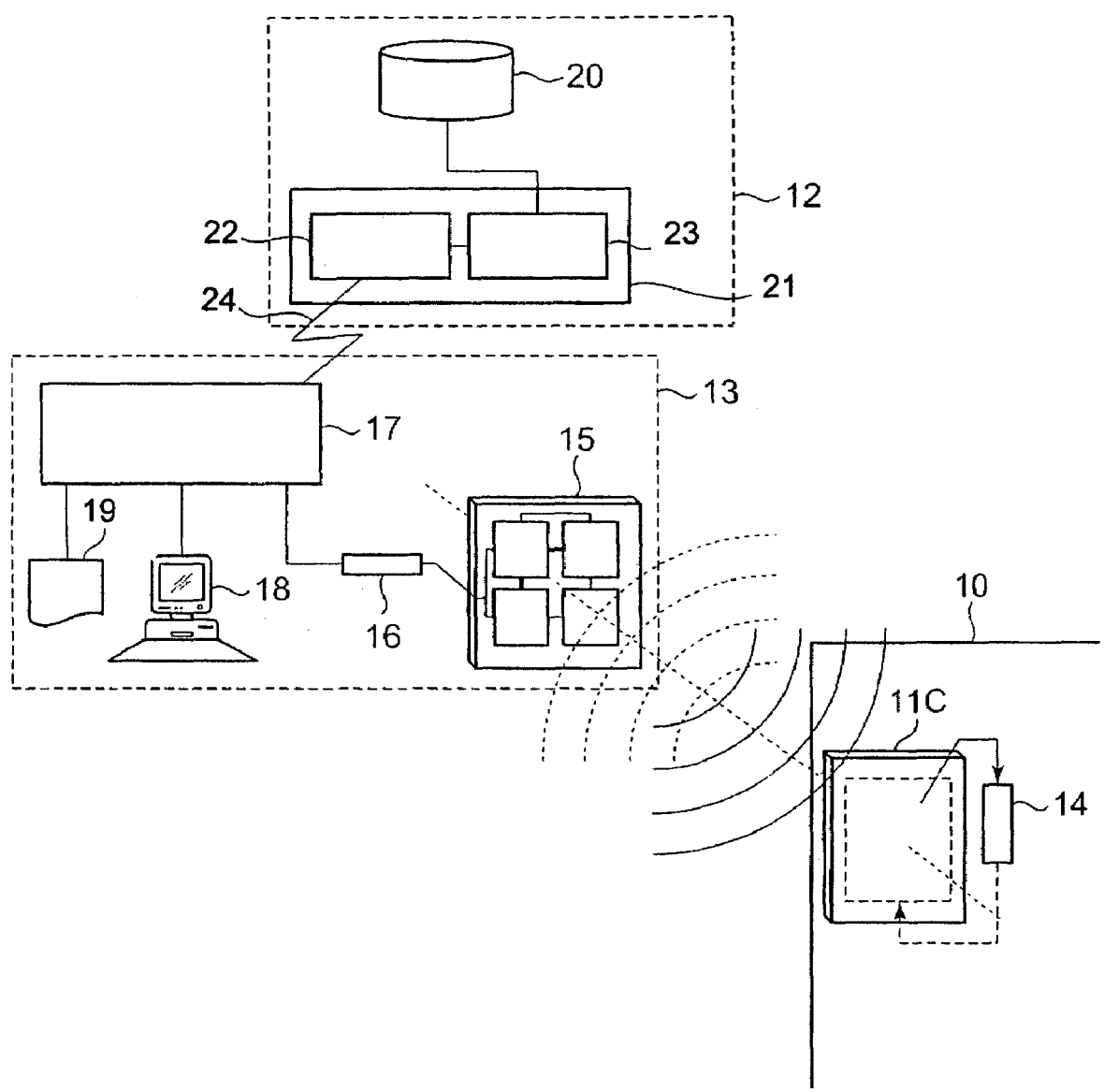
FIG. 6 is a block diagram of a failure history management system according to an embodiment of the invention using a non-rewritable type of RFID.

FIG. 6 shows a block diagram of the failure history management system including an RFID 11C being either a rewritable type or a non-rewritable type.

Figure 7:
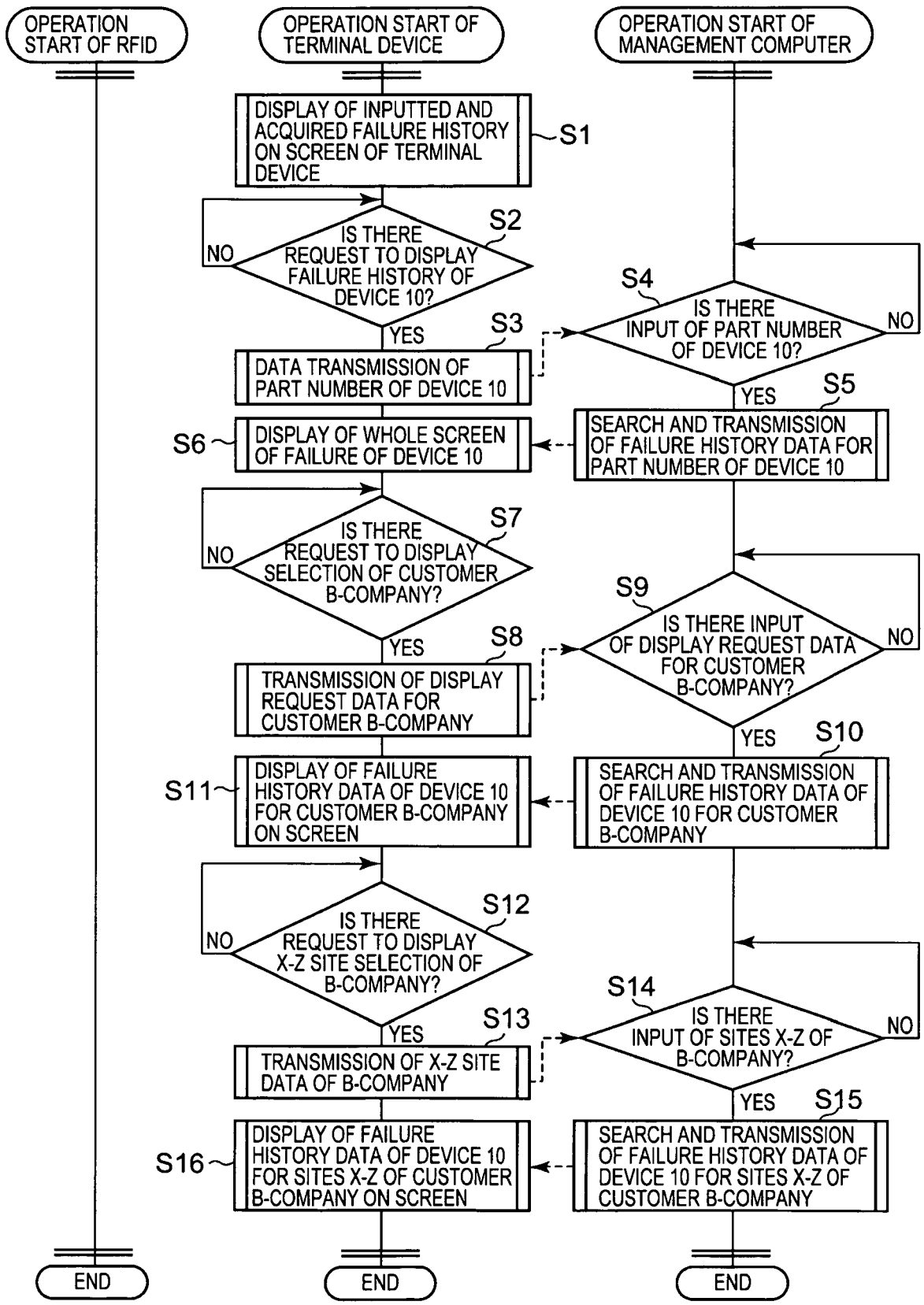
FIG. 7 is a diagram for explaining the operation of the failure history management system according to an embodiment of the invention referencing a failure tendency of a system.

FIG. 7 is a diagram for explaining the operation of the failure history management system according to this embodiment.

In the embodiment, since a procedure of data communication between the terminal device 13 and the RFID 11C of the device 10 from the start of operation of the terminal device in FIG. 7 to a step S1 is similar to the procedure in the aforementioned embodiment, the description of its procedure is omitted.

In FIG. 6, with the manufacturer's serial number recorded in the RFID 11C of the device 10 that is a target of the failure history management as a key, access to the failure history database memory part 20 of the management computer 12 is performed through the reader/writer 15 of the terminal device 13.

Namely, the reader/writer 15 is held to the RFID 11B of the device 10 of B-company, which is a customer, and a failure history data input/acquirement screen of the device 10 is displayed on the display operating device 18. On the screen shown in FIG. 8, a part number of the device 10 is displayed (S1).

The terminal main part 17 judges whether there is display request of the failure history of the device 10 of the customer B-company (S2).

For example, an operator selects a "display request" button on the screen of the display operating device 18 as shown in FIG. 8, whereby it is recognized that there is the display request for the device 10, and the part number data of the device 10 is transmitted from the terminal device 13 to the management computer 12 (S3).

The operation part 23 of the management computer 12 judges whether there is input of the part number information of the device 10 that is the target of the failure history management from the terminal device 13 (S4).

After the operator has input "display request" of the part number of the device 10 from the input acquirement screen as shown in FIG. 8, the operation part 23 receives the part number information transmitted from the terminal device 13, searches failure history data corresponding to the part number of the device 10 from the failure history database memory 20, and transmits a result of search to the terminal device 13 (S5).

The terminal device 13 receives the failure history data corresponding to the part number of the device 10 from the management computer 12, and displays an entire failure screen of the device 10 on the display operating device 18 (S6).

The entire failure screen includes displaying failure history information of each of the devices 10 applied to plural systems on the screen.

For example, as shown in screen display in FIG. 9, failure history data of the device 10 applied to a system of A-company, and failure history data of the device 10 applied to a system of B-company, that is, data relating to an outline (occurrence date and time of the latest failure) of failure history data of the device 10 applied to plural systems are read out from the failure history database memory part 20 of the management computer 12, and transmitted from the management computer 12 to the terminal device 13 to be displayed.

The terminal device 13, in a state where the entire failure screen of the device 10 is displayed on the display operating device 18, judges whether there is display request of the specified customer's selection (S7).

For example, on the display screen of FIG. 9, when there is the selected display request of the customer B-company (when "B-company" on the display screen is touched by the operator), the terminal device 13 transmits the selected display request data of the device 10 of the customer B-company to the management computer 12 (S8).

In the management computer 12, the operation part 23 judges whether there is input of the display request data of the customer B-company from the terminal device 13 (S9).

For example, when the display request of the customer B-company is selected in FIG. 9, the failure history data (site information to which the device 10 is applied) of the device 10 for the customer B-company is searched from the failure history database memory 20 and transmitted to the terminal device 13 (S10).

Figure 10:
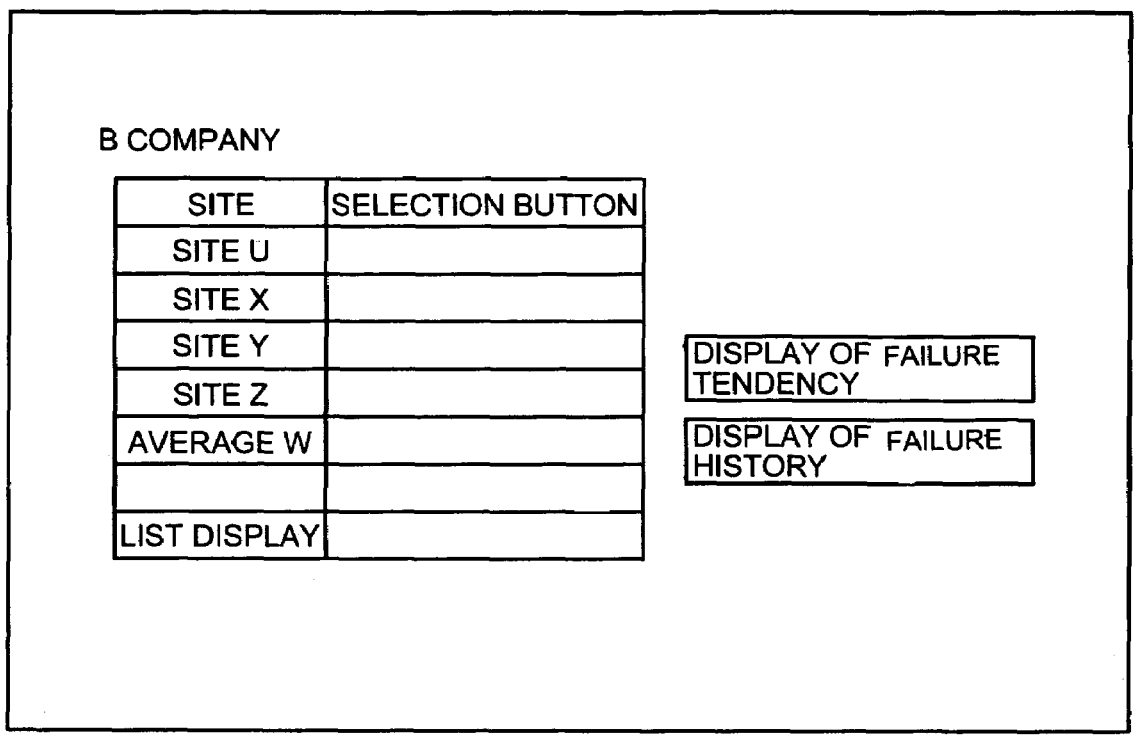

Terminal device 13, provided that it has received the failure history data of the device 10 for the customer B-company, permits a display operation as shown in FIG. 10.

After the reception of the failure history data has been confirmed, a "site" selection button, an "average failure rate" button, a "list display" button, a "display of failure tendency" button, and a "display of failure history" button for the customer B-company are displayed as shown in FIG. 10, and the operator can select a button (S11).

The terminal main part 17 of the terminal device 13 judges whether there is display request of site selection in the plural systems (sites) shown in FIG. 10, which have been applied to the customer B-company (S12).

When display request of X-Z site selection from the plural sites in FIG. 10 that customer B-company has, a display request of average failure rate, a display request of list, and a display of failure tendency are selected, the terminal device 13 transmits the display request data such as the X-Z site data of the customer B-company, the average failure rate data, and the like to the management computer 12 (S13). Here, "average" means average value data of failure rate in each site.

The operation part 23 of the management computer 12 judges whether there is input of the display request data on the sites X to Z for the customer B-company (S14).

If it is judged that the operation part 23 has received the display request data, the failure history data of the device 10 corresponding to the display request data is searched from the failure history database memory 20 and transmitted to the terminal device 13 (S15).

Figure 11:
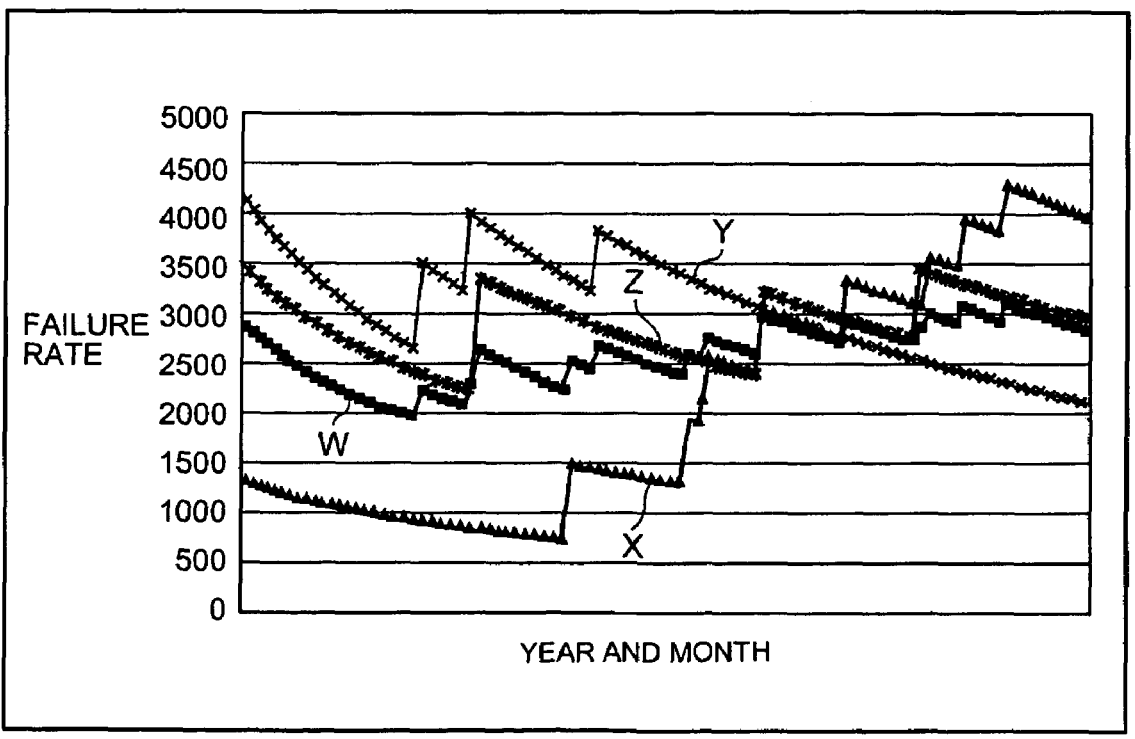
FIG. 11 is a graph showing a failure tendency of a system which is displayed on the display operating device of the failure history management system according to an embodiment of the invention.

The terminal device 13, upon reception of the failure history data of the device for the sites X to Z of the customer B-company from the management computer 12, displays a graph indicating a failure tendency on a screen of the display operating device 18 as shown in FIG. 11 (S16).

FIG. 11 is a graphical example that can be displayed if the sites X to Z, the average W, the list display, and the "display of failure tendency" are selected.

In the graph, failure rate is plotted in a vertical axis, and elapsed time (e.g., year and month) is plotted in a horizontal axis. In FIG. 11, the failure tendency of the device 10 in the whole average W of the B-company and each site X to Z of the B-company is shown for the device 10.

From this graph, it is found that there is a special problem in the site X of the B-company, and the failure of the device 10 occurs frequently in the site X.

As a result, investigation/improvement on the basis of quantitative data can be proposed.

Thus, the operator specifies a search key displayed on the screen of the display operating device 18, whereby the past failure tendency of the device corresponding to this search key is searched.

Namely, the search is performed with the part number of the device as a key, and the failure tendency of the device can be known. In this case, the device includes both a module and a member.

If the search is performed with the part number of a member as a key, a failure tendency of the member can be known. For example, when the site X on FIG. 11 is clicked, by the transmission and reception method between the terminal device 13 and the management computer 12, the detailed failure history data of the site X can be obtained and can be displayed on the screen as shown in FIG. 12.

The states (events) of the device applied to the specified site can be displayed on the screen in FIG. 12 in a time series. As a result, the cause of the problem in the site X can be investigated and analyzed in detail.

FIG. 13 is one example of a management list displayed in case that the "failure history display" button is selected in place of the "display of failure tendency" button in the step S13.

Thus, by managing and displaying "application site," "event date," and "event contents" of each device in association with them, the correlation of the failure history information between the sites can be grasped.

According to the embodiments in accordance with the invention, the RFID 11 is held to the reader/writer 15 of the terminal device 13, and the device-identifying-information can be input. Therefore, it is not necessary to input manually the manufacturer's serial number and the customer's name.

Further, by only selecting the information displayed on the screen of the display operating device 18 of the terminal device 13, the tendency of failure occurrence corresponding to the desired search key is readily available. Since full particulars of the failure tendency of the device can be readily found, failure diagnosis of the device can be quickly performed. The failure tendency becomes the past memory records, which can be used effectively to develop the next device.

By specifying the search keys in combination, the failure tendency of a module and parts can be classified by, for example, the industry of each customers. Namely, from the manufacturer's serial number stored in the RFID 11 attached onto a device, the industrial field of the system on which the device is mounted, the installation environment of the device, and the past failure history of the device can be obtained, the failure analysis can be speedily performed, and background data for proposing environmental improvement on the basis of the causes of failure occurrence can be immediately performed.

In addition to the "display request" button, a password recognition item may be provided on the screen in order to enable the operation by only the operator having the right to operate the device.

In the above-mentioned embodiments, the radio frequency identification has been described as the radio identification tag. However, the embodiments are not limited to radio frequency identification. As long as reading and writing (data calling, registration, deletion, renewal, and the like) can be performed, any radio identification tag may be used.

In the above-mentioned figures, an element like a desktop computer as the display operating device is described. However, this element is not limited to a desktop computer. Any device capable of performing the same function of the display operating device, like a Personal Digital Assistant (PDA) or laptop computer, may be used.

According to the invention, with device-identifying-information recorded in a radio identification tag of a device as a key, access to a failure history database of a management computer can be performed, and the tendency of failure occurrence of the system on which the device is mounted can be determined.

As a result, it is not necessary to refer manually to the manufacturer's serial number or customer's name of the device. By only reading the device-identifying-information recorded in the radio identification tag by means of the terminal device, the tendency of failure occurrence can be readily known.

Thus, correlation between the failure tendency and the failure history information can be grasped, and a life and exchange timing of the device can be grasped. Therefore, earlier preparation for a new device is also possible.

The foregoing description of preferred embodiments of the invention has been presented for purposes of illustration and description. It is not intended to be exhaustive or to limit the invention to the precise form disclosed, and modifications and variations are possible in light in the above teachings or may be acquired from practice of the invention. The embodiments (which can be practiced separately or in combination) were chosen and described in order to explain the principles of the invention to enable one skilled in the art to make and use the invention in various embodiments and with various modifications suited to the particular use contemplated. It is intended that the scope of the invention be defined by the claims appended hereto and their equivalents.

What is claimed is:

1. A failure history management system, comprising:
a radio identification tag that is placed on a device and stores device-identifying-information that identifies the device;
a management computer for managing failure history data of the device; and
a terminal unit configured to identify the device from the device-identifying-information stored in the radio identification tag, to read failure history data of the device from the management computer, and to provide failure history data of the device to the management computer,
wherein the radio identification tag includes a non-rewritable memory, which stores the device-identifying-information that identifies the device,
wherein the terminal unit includes an input device through which failure history data of the device is entered,
wherein the terminal unit is configured to provide the failure history data of the device entered through the input device of the terminal unit to the management computer, and
wherein the management computer includes a memory that stores the failure history data of the device in a database including the failure history data of the device entered through the input device of the terminal unit.

2. A failure history management system, comprising:
a radio identification tag that is placed on a device and stores device-identifying-information that identifies the device;
a management computer for managing failure history data of the device; and
a terminal unit configured to identify the device from the device-identifying-information stored in the radio identification tag, to read failure history data of the device from the management computer, and to provide failure history data of the device to the management computer,
wherein the terminal unit includes an input device through which failure history data of the device is entered,
wherein the terminal unit is configured to provide the failure history data of the device entered through the input device of the terminal unit to the management computer and to the radio identification tag, and
wherein the radio identification tag includes a rewritable memory that stores failure history data of the device including the failure history data of the device entered through the input device of the terminal unit.

3. A failure history management system, comprising:
a radio identification tag that is placed on a device and stores device-identifying-information that identifies the device;
a management computer for managing failure history data of the device; and
a terminal unit configured to identify the device from the device-identifying-information stored in the radio identification tag, to read failure history data of the device from the management computer, and to provide failure history data of the device to the management computer,
wherein the terminal unit is further configured to receive the failure history data of the device from the management computer in response to providing the device-identifying-information of the device to the management computer and
wherein the terminal unit is further configured to display an average failure rate for the device based on the failure history data received from the management computer.

* * * * *